United States Patent
Tian (10) Patent No.: US 8,942,491 B2
(45) Date of Patent: Jan. 27, 2015

(54) TOPOLOGY-PRESERVING DOWNSAMPLING OF BINARY IMAGES

(71) Applicant: Yibin Tian, Menlo Park, CA (US)

(72) Inventor: Yibin Tian, Menlo Park, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 96 days.

(21) Appl. No.: 13/689,655

(22) Filed: Nov. 29, 2012

(65) Prior Publication Data

US 2014/0147054 A1    May 29, 2014

(51) Int. Cl.
  *G06K 9/36*    (2006.01)
  *G06T 9/00*    (2006.01)

(52) U.S. Cl.
  CPC .................................. *G06T 9/00* (2013.01)
  USPC ........... 382/232; 382/233; 382/299; 382/239; 382/250; 382/251

(58) Field of Classification Search
  CPC ............... H04N 19/00757; H04N 19/00387; H04N 19/00418; G06T 3/4023; G06T 3/40
  USPC ................. 382/232, 233, 239, 299, 250, 251; 375/240, 240.01, 240.12, 240.16, 375/240.21
  See application file for complete search history.

(56) References Cited

U.S. PATENT DOCUMENTS

| | | | | |
|---|---|---|---|---|
| 6,563,964 | B1 | 5/2003 | Hallberg | |
| 7,308,031 | B2 * | 12/2007 | Yamaguchi et al. | 375/240.21 |
| 2008/0029602 | A1 * | 2/2008 | Burian et al. | 235/462.09 |
| 2009/0262931 | A1 * | 10/2009 | Nakagata et al. | 380/54 |

OTHER PUBLICATIONS

Decenciere et al., "Downsampling of Binary Images using Adaptive Crossing Numbers" in Mathematical Morphology: 40 Years on, Edited by Ronse et al., Paris, France, Apr. 2005, pp. 279-288.

* cited by examiner

*Primary Examiner* — Ali Bayat
(74) *Attorney, Agent, or Firm* — Chen Yoshimura LLP (57) ABSTRACT

A binary image downsampling method, including the steps of generating a gray-scale image from a binary image having a background and one or more foreground portions, locating skeleton pixels in the one or more foreground portions, manipulating values of certain foreground pixels in the gray-scale image such that the differences between the values of the skeleton pixels and the background pixels become more significant, downsampling the gray-scale image with the manipulated values of the certain foreground pixels, and generating a downsampled binary image from the downsampled gray-scale image.

20 Claims, 9 Drawing Sheets

FIG. 1

ABCDEFGH
IJKLMNOP
QRSTUVWX
YZabcdef
ghijklmn
opqrstuv
wxyz1234
567890

TOPOLOGY-PRESERVING DOWNSAMPLING OF BINARY IMAGES

BACKGROUND OF THE INVENTION

1. Field of the Invention

This invention relates to downsampling of binary images, and more particularly it relates to topology-preserving downsampling of binary images.

2. Description of Related Art

Digital image downsampling is widely used in today's computer graphic and image processing applications. Various approaches have been introduced to reduce image quality loss in a down-sampling process.

For example, U.S. Pat. No. 6,563,964 disclosed an image downsampling method using a redundant pixel removal approach for computer-graphics imagery applications, where a digital image is downsampled non-uniformly in a manner that attempts to minimize aliasing of high-spatial-frequency image information by concentrating deletion paths in lower-spatial-frequency image regions, by using a spatial frequency estimator that compares groups of pixels in order to produce a classification of the image, a path generator and path scorer that traces and scores potential deletion paths through the image where the path with the greatest score (i.e., one that provides minimal distortion and aliasing) is selected for pixel removal, and a re-cursor that repeats this process until a desired number of image rows and/or columns have been removed.

Another example is found by E. Decencière, and M. Bilodeau, "Downsampling of Binary Images Using Adaptive Crossing Numbers", in C. Ronse, L. Najman and E. Decencière editors, *Mathematical Morphology: 40 Years On* (Proceedings of ISMM'2005), pp. 279-288, (Paris, France, April 2005. Springer), which described a technique using adaptive crossing numbers for downsampling of binary images.

The prior arts described above may have some effects to preserve the topology of the binary images, but they are complex and slow in practice. However, it is still desirable to have a simple and fast method for downsampling of binary images that preserves the topology of the binary images.

SUMMARY

The present invention is directed to a method for topology preserving down-sampling of binary images.

An object of the present invention is to provide a simple and fast method for down-sampling of binary images that preserves the topology of the binary images.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a binary image downsampling method which includes the steps of generating a gray-scale image from a binary image having a background and one or more foreground portions, locating skeleton pixels in the one or more foreground portions, manipulating values of certain foreground pixels in the gray-scale image such that the differences between the values of the skeleton pixels and the background pixels become more significant, downsampling the gray-scale image with the manipulated values of the certain foreground pixels, and generating a downsampled binary image from the downsampled gray-scale image.

In another aspect, the present invention provides a non-transitory computer readable recording medium having a computer readable program code embedded therein for controlling a data processing apparatus, the computer readable program code configured to cause the data processing apparatus to execute the process of the above method.

In a further aspect, the present invention provides a system configured to cause a data processing apparatus to execute the process of the above method.

It is to be understood that both the foregoing general description and the following detailed description are exemplary and explanatory and are intended to provide further explanation of the invention as claimed.

DETAILED DESCRIPTION OF PREFERRED EMBODIMENTS

Embodiments of the present invention provide a method for down-sampling of binary images that preserves the topology of the binary images.

Downsampling of an original image having a higher resolution typically involves producing a resulting image of a lower resolution. However, reducing image resolution often results in losing detailed features of the original image in the resulting image.

Figure 2:
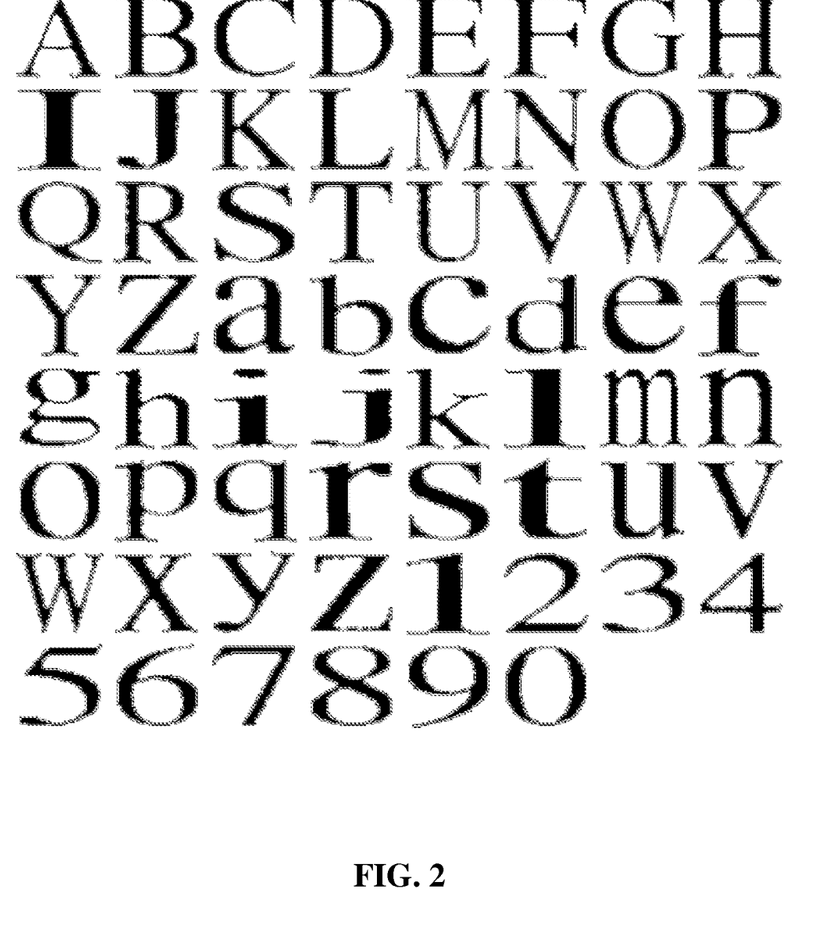
FIG. 2 illustrates an exemplary text image before downsampling.
Figure 3A:
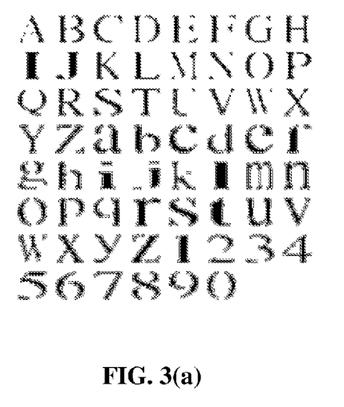
FIG. 3(a) illustrates the result of a conventional bilinear downsampling of the exemplary text image shown in FIG. 2.
Figure 4A:
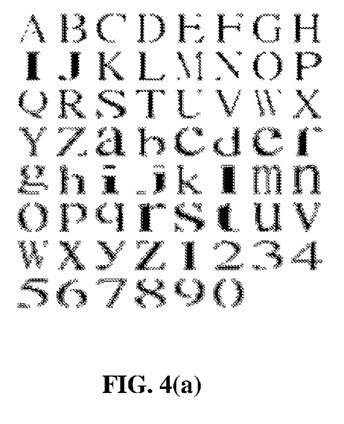
FIG. 4(a) illustrates the result of a conventional bicubic downsampling of the exemplary text image shown in FIG. 2.

For example, there is shown in FIG. 2 an exemplary original text image having a resolution of 51×51 pixels per character. After a conventional process of bilinear downsampling by a factor of 2.4, the resulting image having a resolution of 21×21 pixels per character is shown in FIG. 3(a) which exhibits obvious visible loss of character details. Similarly, after a conventional process of bicubic downsampling by the same factor of 2.4, the resulting image having a resolution of 21×21 pixels per character is shown in FIG. 4(a) which also exhibits obvious visible loss of character details.

Figure 5:
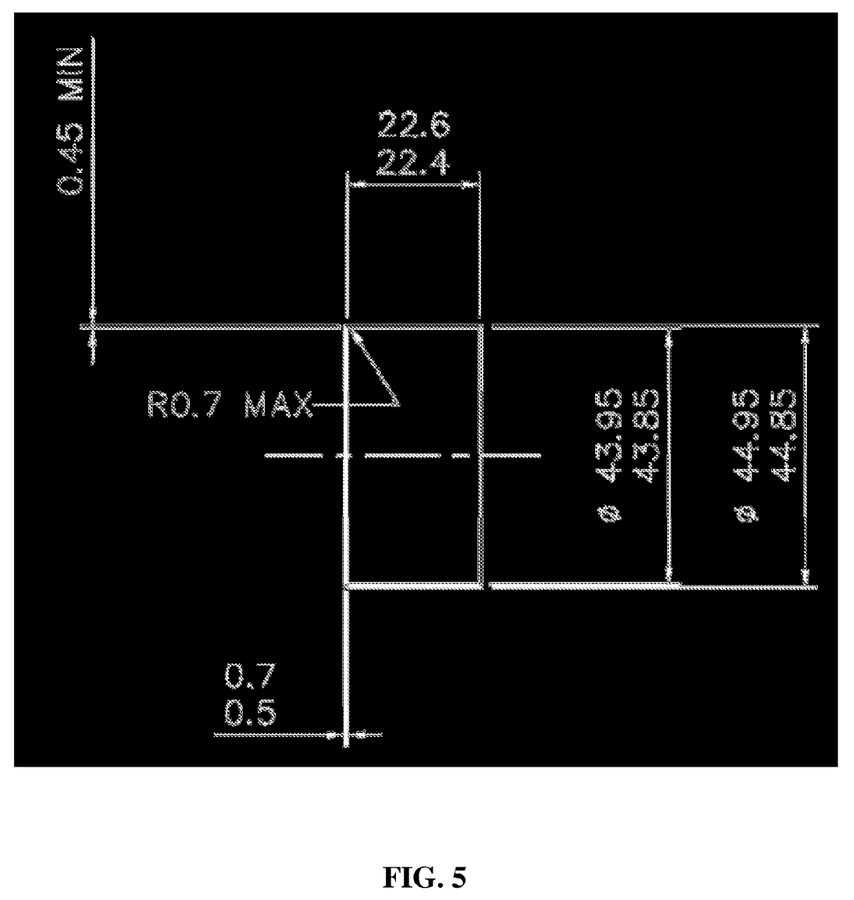
FIG. 5 illustrates an exemplary graphic image before downsampling.
Figure 6A:
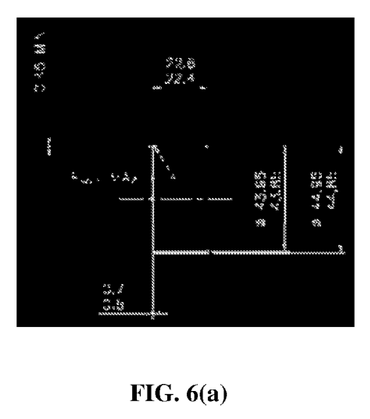
FIG. 6(a) illustrates the result of a conventional bilinear downsampling of the exemplary graphic image shown in FIG. 5.
Figure 6B:
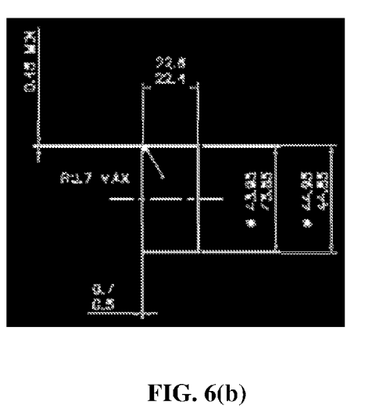
FIG. 6(b) illustrates the result of a new bilinear downsampling of the exemplary graphic image shown in FIG. 5 according to embodiments of the present invention.

Another example is shown in FIGS. 5, 6(a) and 6(b). FIG. 5 shows an exemplary original graphic image having a resolution of 602×552 pixels. After a conventional process of bilinear downsampling by a factor of 2, the resulting image having a resolution of 301×272 pixels shown in FIG. 6(a) again exhibits obvious visible loss of drawing details. Likewise after a conventional process of bicubic downsampling by the same factor of 2, the resulting image having a resolution of 301×272 pixels shown in FIG. 7(a) still exhibits obvious visible loss of drawing details.

The purposes of the present invention method include the provision of a process for downsampling of a higher resolution original image while preserving the topology of the original image by enhancing the "skeleton" of the original image, to reduce the loss of details in the lower resolution resulting image from the higher resolution original image. Generally an image may have a background portion and one or more foreground portions. In some images the background pixels have a greater value than the pixels of the foreground portions (or objects of interest, such as texts), while in others the opposite is true. For example, if a text document is considered as an image, then it may have a white background portion and one or more black foreground portions which may be black texts on the white background ("black-on-white"), or a black background portion and one or more white foreground portions which may be white texts on the black background ("white-on-black"), In this application, a skeleton is the medial axes of a foreground portion in a binary image.

To achieve these and other purpose, the downsampling method according to the embodiments of the present invention processes an original binary image in both binary and gray-scale spaces. Optionally the binary image may be denoised by using, e.g., standard morphological operations such as "open" and "close" operations. First, a gray-scale image is created from the binary image, and then those pixels on the skeletons of the original image are enhanced or boosted such that they deviate more from the pixel values in the background, which is the equivalent of weighing the skeleton pixels more than other pixels. This is typically done by increasing or decreasing the pixel values of the skeleton, depending on the image. For example, the skeleton pixel values may be increased if the foreground has greater values than the background, or decreased if the foreground has smaller values than the background. However, while generally it is the values of the skeleton pixels that are manipulated, the pixel values of other foreground portions are also subject to manipulation insofar as the differences between the values of the skeleton pixels and the background pixels become more significant as compared to the differences between the pixel values of the remaining foreground portions and the background portion. Next, a conventional two-dimensional interpolation process is used to downsample the gray-scale image. Afterwards, the downsampled gray-scale image is binarized via a conventional thresholding process to produce the resulting binary image. Additional post-processing may be carried out for various touch-ups, e.g., to remove isolated pixels or fill small unwanted holes.

Figure 1:
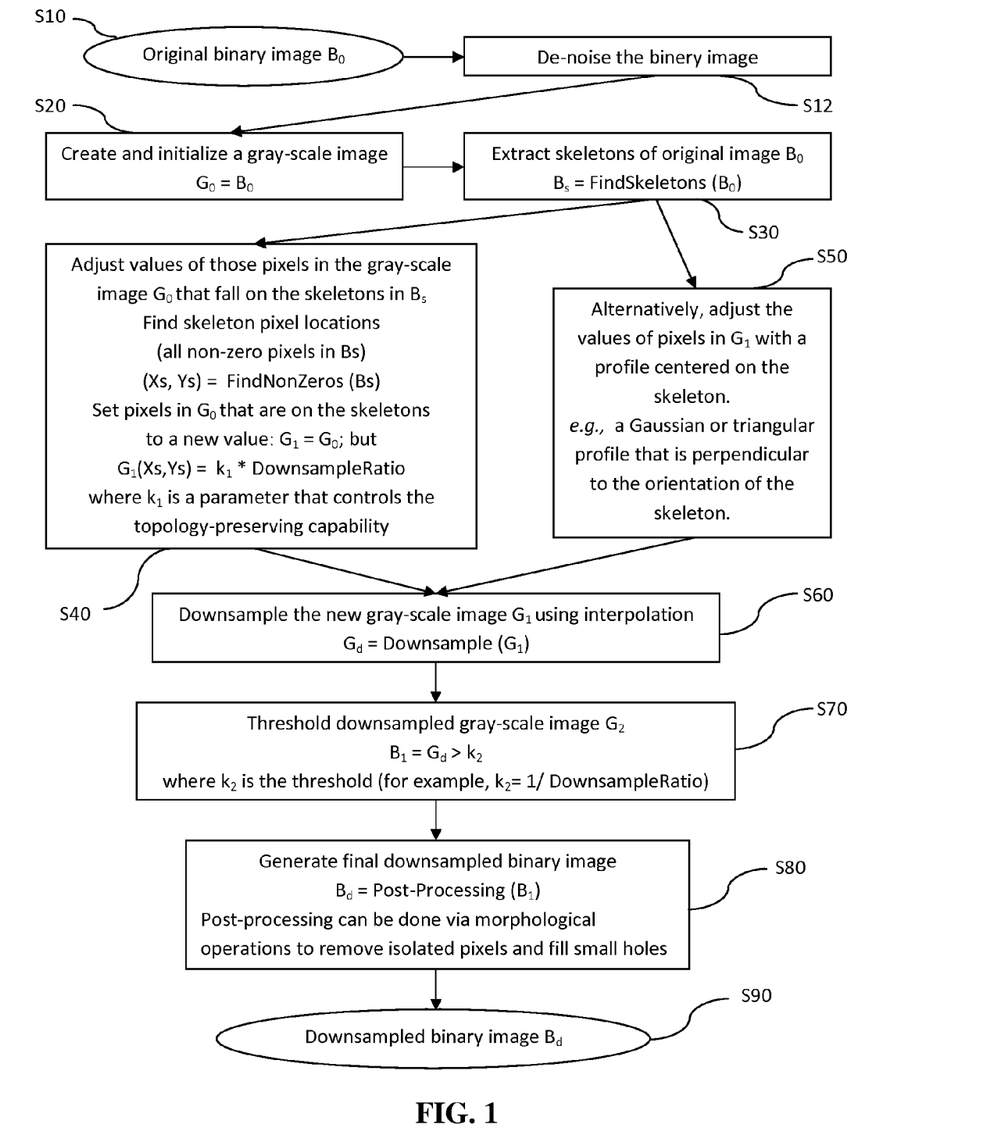
FIG. 1 is a flow chart diagram illustrating the method for topology-preserving downsampling of binary images according to embodiments of the present invention.

Referring to FIG. 1, there is shown a flow chart diagram illustrating the method for topology-preserving downsampling of binary images according to one embodiment of the present invention.

The process begins at Step S10 where an original binary image $B_0$ is to be downsampled. For illustration purposes, an exemplary original binary image $B_0$ of the character or symbol "I" is shown FIG. 8.

Referring back to FIG. 1, at Step S20 a gray-scale image $G_0$ is created and initialized from the original binary image $B_0$, .i.e.:

$$G_0 = B_0 \quad [1]$$

Next, at Step S30, the skeletons $B_s$ of the original image $B_0$ is extracted using a standard skeletonization method, such as morphological openings or the hit-or-miss transform:

$$B_s = \text{FindSkeletons}(B_0) \quad [2]$$

Figure 8:
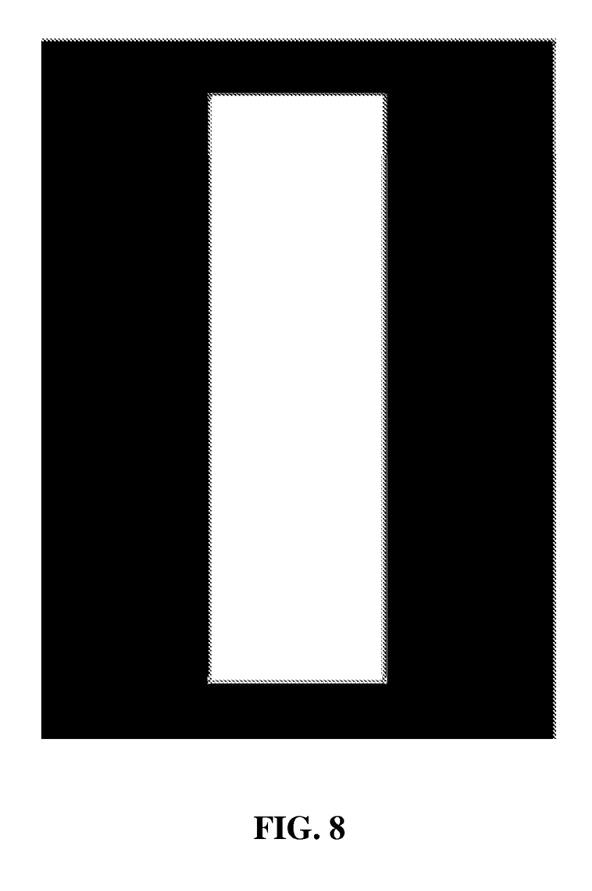
FIG. 8 illustrates an exemplary binary image of the character or symbol "I".
Figure 9A:
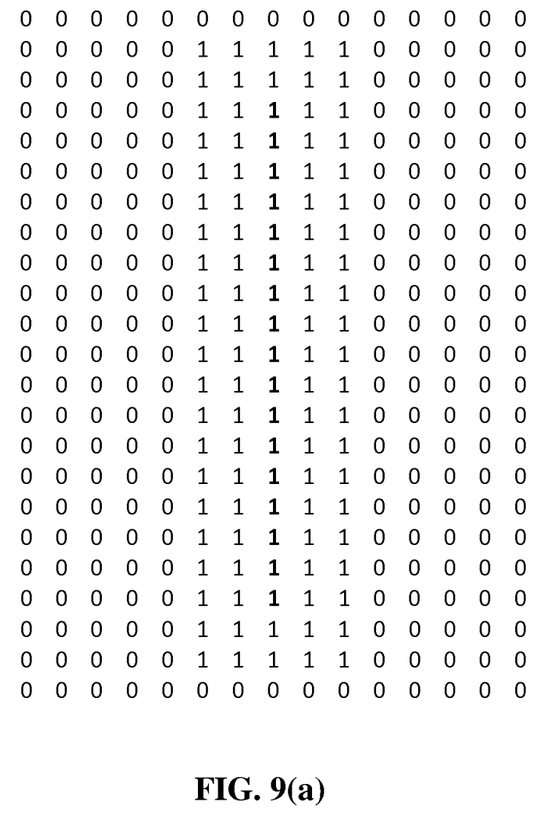
FIG. 9(a) illustrates pixel values of the exemplary binary image shown in FIG. 8.

For example, in FIG. 9(a), the pixel values of the binary image $B_0$ of the character or symbol "I" shown in FIG. 8 is illustrated, where the pixel value of the white part in FIG. 8 are "1" and the pixel value of the white part in FIG. 8 are "0". The "1" pixels in the middle line, except the top two "1"s and the bottom two "1"s are the skeleton pixels (shown in bold "1"s in FIG. 9(a)).

At Step S40, the values of the skeleton pixels in the gray-scale image $G_0$ corresponding to $B_s$ are adjusted with increased or enhanced values, such as from 1 to 10. First, the locations of the skeleton pixel (i.e., all non-zero pixels in $B_s$) are identified:

$$(X_s, Y_s) = \text{FindNonZeros}(B_s) \quad [3]$$

Second, these skeleton pixels in $G_0$ are set to a new, increased value such that the pixel locations of gray-scale image $G_1$ is the same as $G0$ but the skeleton pixels have increase values in $G_1$ $$G_1(X, Y) = G_0(X, Y) \quad [4]$$

$$G_1(X_s, Y_s) = k_1 * \text{DownsampleRatio} \quad [5]$$

where $k_1$ is a parameter that controls the topology-preserving capability of the downsampling.

Figure 9B:
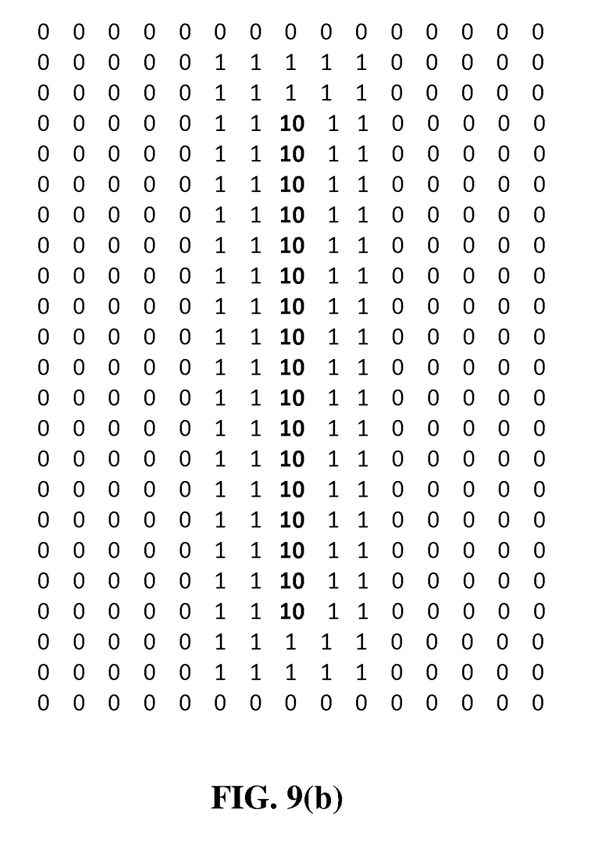
FIG. 9(b) illustrates adjusting pixel values of only the skeleton of the exemplary binary image shown in FIG. 8 according to embodiments of the present invention.

Referring to FIG. 9(b), there is illustrated that only the skeleton pixel values of the exemplary binary image shown in FIG. 8 are adjusted from 1 to 10.

Alternatively at Step 50, the values of pixels in $G_1$ may be adjusted with a profile centered on the skeleton, e.g. a Gaussian or triangular profile that is perpendicular to the orientation of the skeleton. Other examples of the profiles that may be used for this step include, e.g. non-symmetric profiles which will generate some special effects to the resulting image.

Figure 9C:
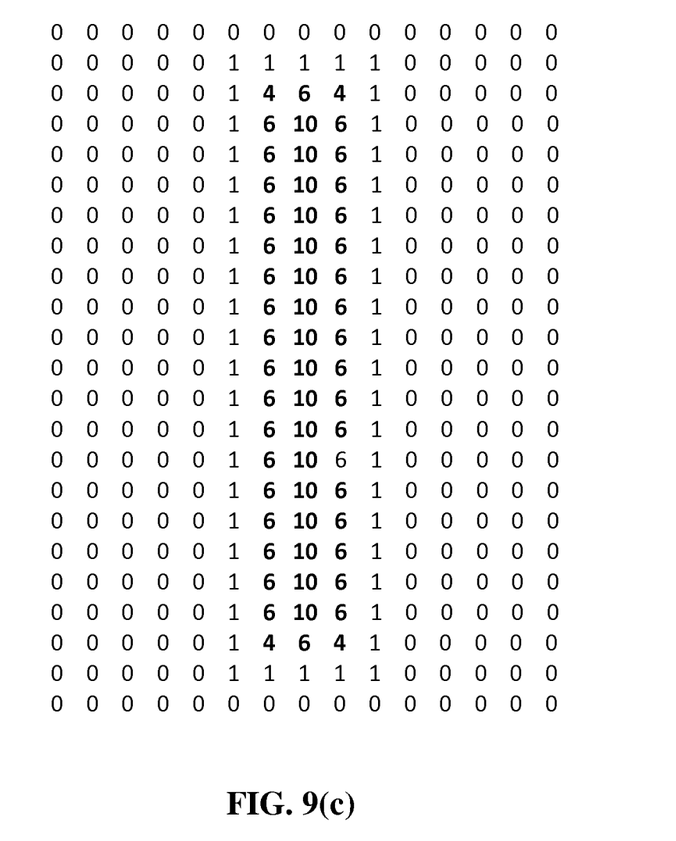
FIG. 9(c) illustrates adjusting pixel values based on a profile centered on the skeleton of the exemplary binary image shown in FIG. 8 according to embodiments of the present invention.

Referring to FIG. 9(c), there is illustrated that the values of the "1" pixels of the exemplary binary image shown in FIG. 8 are adjusted based on a profile, such that the skeleton pixel values are adjusted from 1 to 10, the values of the pixels adjacent to the skeleton pixels are adjusted from 1 to 6, and so on. This may result in a more smooth transition at the edge of the skeleton in the downsampled image.

Next at Step S60, the new gray-scale image $G_1$ is downsampled to a downsampled gray-scale image $G_d$ by using, e.g., an interpolation technique, such as nearest-neighbor, bilinear, bicubic interpolations, and so on $G_d$=Downsample ($G_1$)            [6]

At Step S70, the downsampled gray-scale image G2 is binarized to a binary image $B_1$ by using, e.g., a thresholding technique $B_1 = G_d > k_2$            [7]

where $k_2$ is the threshold, for example:

$k_2 = 1/$DownsampleRatio            [8]

Optionally, other more sophisticated thresholding methods may be used for Step S70, such as hyteresis thresholding by applying a high threshold and a low threshold, where the high threshold is applied in a first thresholding step, and a first binary image is generated. Using the first binary image, it may be assumed that pixels connected to the foreground pixels in the first binary image are also likely to be foreground pixels even if their pixel values are below the high threshold value. Thus, in a second step, the low threshold is applied to these pixels to expand the foreground in the first binary image.

At Step S80, a final downsampled binary image $B_d$ is generated with post-processing, if necessary:

$B_d$=Post-Processing ($B_1$)            [9]

The post-processing may be done by, e.g., morphological operations to remove isolated pixels and/or fill small holes.

Figure 3B:
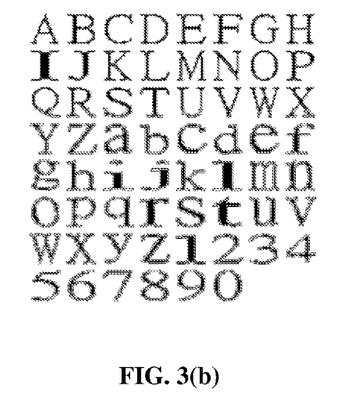
FIG. 3(b) illustrates the result of a new bilinear downsampling of the exemplary text image shown in FIG. 2 according to embodiments of the present invention.

Finally at Step S90, the process produces the resulting downsampled binary image $B_d$. FIGS. 3(*b*), 4(*b*), 6(*b*) and 7(*b*) are exemplary resulting downsampled binary images of the original image shown in FIGS. 2 and 5 respectively.

Referring to FIG. 3(*b*), there is illustrated the resulting image downsampled from the original text image shown in FIG. 2, using a bilinear downsampling according to embodiments of the present invention. While the resolution of this downsampled image is also 21×21 pixels per character (the same as the downsampled image shown in FIG. 3(*a*)), it has less loss of the details and clarity as compared to the conventionally downsampled image shown in FIG. 3(*a*).

Figure 4B:
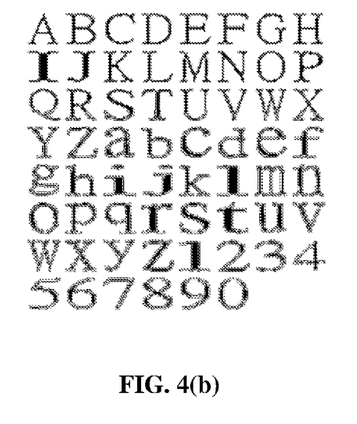
FIG. 4(b) illustrates the result of a new bicubic downsampling of the exemplary text image shown in FIG. 2 according to embodiments of the present invention.

Referring to FIG. 4(*b*), there is illustrated the resulting image downsampled also from the original text image shown in FIG. 2, using a bicubic downsampling according to embodiments of the present invention. While the resolution of this new downsampled image is still 21×21 pixels per character (the same as the downsampled image shown in FIG. 4(*a*)), again it has less loss of the details and clarity as compared to the conventionally downsampled image shown in FIG. 4(*a*).

Referring to FIG. 6(*b*), there is illustrated the resulting image downsampled from the original graphic image shown in FIG. 5, using a bilinear downsampling according to embodiments of the present invention. While the resolution of this downsampled image is also 301×276 pixels (the same as the downsampled image shown in FIG. 6(*a*)), it has less loss of the details and clarity as compared to the conventionally downsampled image shown in FIG. 6(*a*).

Figure 7A:
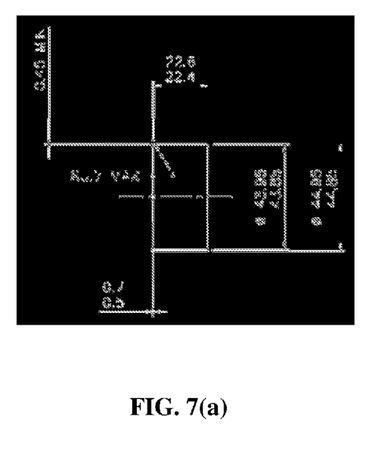
FIG. 7(a) illustrates the result of a conventional bicubic downsampling of the exemplary graphic image shown in FIG. 5.
Figure 7B:
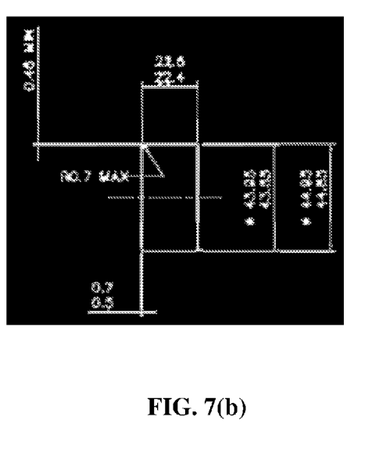
FIG. 7(b) illustrates the result of a new bicubic downsampling of the exemplary graphic image shown in FIG. 5 according to embodiments of the present invention.

Referring to FIG. 7(*b*), there is illustrated the resulting image downsampled also from the original graphic image shown in FIG. 5, using a bicubic downsampling according to embodiments of the present invention. While the resolution of this downsampled image is still 301×276 pixels (the same as the downsampled image shown in FIG. 7(*a*)), again it has less loss of the details and clarity as compared to the conventionally downsampled image shown in FIG. 7(*a*). Moreover, the bicubic downsampling according to embodiments of the present invention appears to offer a better result as compared to the bilinear downsampling, as the downsampled image shown in FIG. 7(*b*) appears to have less loss of details and more clarity as compared to the downsampled image shown in FIG. 6(*b*).

In addition to the above described aspect, the invention may be embodied in a non-transitory computer readable recording medium having a computer readable program code embedded therein for controlling a data processing apparatus, the computer readable program code configured to cause the data processing apparatus to execute the process of the topology-preserving downsampling method according to embodiments of the present invention.

In a further aspect, the present invention may be embodied in a system configured to cause a data processing apparatus to execute the process of the topology-preserving downsampling method according to embodiments of the present invention.

It will be apparent to those skilled in the art that various modification and variations can be made in the method and related apparatus of the present invention without departing from the spirit or scope of the invention. Thus, it is intended that the present invention cover modifications and variations that come within the scope of the appended claims and their equivalents.

What is claimed is:

1. A binary image downsampling method, comprising:
   generating a gray-scale image from a binary image having a background and one or more foreground portions;
   locating skeleton pixels of the gray-scale image, which are pixels corresponding to skeletons of the binary image in the one or more foreground portions;
   manipulating values of certain foreground pixels in the gray-scale image including at least the skeleton pixels, by changing their original pixel values to new pixel values wherein differences between the new pixel values and background pixel value is greater than differences between the original pixel values and the background pixel value;
   downsampling the gray-scale image after manipulating the values of the certain foreground pixels; and
   generating a downsampled binary image from the downsampled gray-scale image.

2. The method of claim 1, wherein the manipulating step manipulates the values of only the skeleton pixels.

3. The method of claim 1, wherein the manipulating step manipulates the values of the skeleton pixels and the pixels that are surrounding the skeleton pixels based on a profile.

4. The method of claim 3, wherein the profile is a symmetric profile centered on the skeleton pixels.

5. The method of claim 4, wherein the symmetric profile is selected from a group of symmetric profiles including a Gaussian profile and a triangular profile.

6. The method of claim 3, wherein the profile is an asymmetric profile.

7. The method of claim 1, wherein the gray-scale image is downsampled by an interpolation technique.

8. The method of claim 1, wherein the downsampled binary image is generated by a threshold technique.

9. The method of claim 1, further comprising a step of post-processing of the downsampled binary image by morphological operations.

10. The method of claim 1, wherein in the step of generating a gray-scale image, each pixel of the gray-scale image is assigned a pixel value equal to that of a corresponding pixel of the binary image.

11. A non-transitory computer readable recording medium having a computer readable program code embedded therein for controlling a data processing apparatus, the computer readable program code configured to cause the data processing apparatus to execute a process for binary image downsampling method, the process comprising:

generating a gray-scale image from a binary image having a background and one or more foreground portions;

locating skeleton pixels of the gray-scale image, which are pixels corresponding to skeletons of the binary image in the one or more foreground portions;

manipulating values of certain foreground pixels in the gray-scale image including at least the skeleton pixels, by changing their original pixel values to new pixel values wherein differences between the new pixel values and background pixel value is greater than differences between the original pixel values and the background pixel value;

downsampling the gray-scale image after manipulating the values of the certain foreground pixels; and generating a downsampled binary image from the downsampled gray-scale image.

12. The non-transitory computer readable recording medium of claim 11, wherein the manipulating step manipulates the values of only the skeleton pixels.

13. The non-transitory computer readable recording medium of claim 11, wherein the manipulating step manipulates the values of the skeleton pixels and the pixels that are surrounding the skeleton pixels based on a profile.

14. The non-transitory computer readable recording medium of claim 13, wherein the profile is a symmetric profile centered on the skeleton pixels.

15. The non-transitory computer readable recording medium of claim 14, wherein the symmetric profile is selected from a group of symmetric profiles including a Gaussian profile and a triangular profile.

16. The non-transitory computer readable recording medium of claim 13, wherein the profile is an asymmetric profile.

17. The non-transitory computer readable recording medium of claim 11, wherein the gray-scale image is downsampled by an interpolation technique.

18. The non-transitory computer readable recording medium of claim 11, wherein the downsampled binary image is generated by a threshold technique.

19. The non-transitory computer readable recording medium of claim 11, wherein the process further comprises a step of post-processing of the downsampled binary image by morphological operations.

20. The non-transitory computer readable recording medium of claim 11, wherein in the step of generating a gray-scale image, each pixel of the gray-scale image is assigned a pixel value equal to that of a corresponding pixel of the binary image.

\* \* \* \* \*